United States Patent [19]

Levrai

[11] Patent Number: 4,996,843
[45] Date of Patent: Mar. 5, 1991

[54] TANDEM HYDRAULIC PRESSURE TRANSMITTER DEVICE

[75] Inventor: Roland Levrai, Stains, France
[73] Assignee: Bendix France, Drancy, France
[21] Appl. No.: 358,750
[22] Filed: May 30, 1989

[30] Foreign Application Priority Data

May 31, 1988 [FR] France .................. 88 07240

[51] Int. Cl.$^5$ ............................................. B60T 11/20
[52] U.S. Cl. ...................................................... 60/562
[58] Field of Search ........................................ 60/562

[56] References Cited

U.S. PATENT DOCUMENTS 3,698,190 10/1972 Miyai ..................................... 60/562
3,844,121 10/1974 Griesenbrock ......................... 60/562

FOREIGN PATENT DOCUMENTS 1571663 6/1969 France .
977268 12/1964 United Kingdom .
1215055 12/1970 United Kingdom .

Primary Examiner—William E. Wayner
Attorney, Agent, or Firm—Larry J. Palguta; Ken C. Decker

[57] ABSTRACT

The invention relates to a tandem hydraulic pressure transmitter device, particularly for a hydraulic circuit in a motor vehicle, comprising a first piston sliding sealingly in a first bore, adaptive to be operated by a first operating mechanism, and transmitting a first pressure to at least one pressure receiver, and a second piston sliding sealingly in a second bore, adapted to be operated by a second operating mechanism, and transmitting a second pressure to at least one other pressure receiver. According to the invention, the first and second pistons are returned to their positions of rest by the first and second operating mechanisms, respectively.

8 Claims, 2 Drawing Sheets

TANDEM HYDRAULIC PRESSURE TRANSMITTER DEVICE

The present invention relates to a tandem hydraulic pressure transmitter device which is particularly intended for generating a pressure in a hydraulic circuit in a motor vehicle.

Devices of this kind are already known and are even obligatory under legislation, for example for hydraulic braking systems in which two circuits independent of each other have to be provided, for example for front and rear wheels, in order that braking will still be effective in one circuit if a failure occurs in the other. Numerous types of tandem master cylinders have thus been evolved, comprising two working chambers each feeding one circuit of the hydraulic braking system. All these types of master cylinders have the common feature that they are composed of numerous parts in order to ensure that they will operate both under normal conditions and in the event of the failure of one of the circuits, so that their length becomes fairly considerable. Moreover, when a braking assistance device is provided, it is usual for this device to be placed in line with the master cylinder itself or with an additional pressure transmitter device, thereby further increasing the length dimension of the unit. Accommodation of this unit in the engine compartment may then entail problems in certain types of vehicle, particularly in right-hand drive vehicles.

Pressure transmitter devices are also used in motor vehicles for operating various pressure receivers, such as clutches, high-pressure valves, and so on. These hydraulic pressure transmitters also have a complex construction and relatively large dimensions.

The invention therefore seeks to provide a tandem pressure transmitter device for two hydraulic circuits, which is of small dimensions and is reliable, that is to say able to transmit a pressure in one circuit if a fault develops in the other circuit.

This aim of the invention is achieved with the aid of a tandem hydraulic pressure transmitter device, particularly for a hydraulic circuit in a motor vehicle, which device comprises a first piston sliding sealingly in a first bore, adapted to be operated by a first operating means, and transmitting a first pressure to at least one pressure receiver, and a second piston sliding sealingly in a second bore, adapted to be operated by a second operating means, and transmitting a second pressure to at least one other pressure receiver, characterized in that the first and second pistons are returned to their positions of rest by the first and second operating means respectively.

The invention will now be described by way of illustrative example which is not in any way limitative, and with reference to the accompanying drawings, in which.

Figure 1:
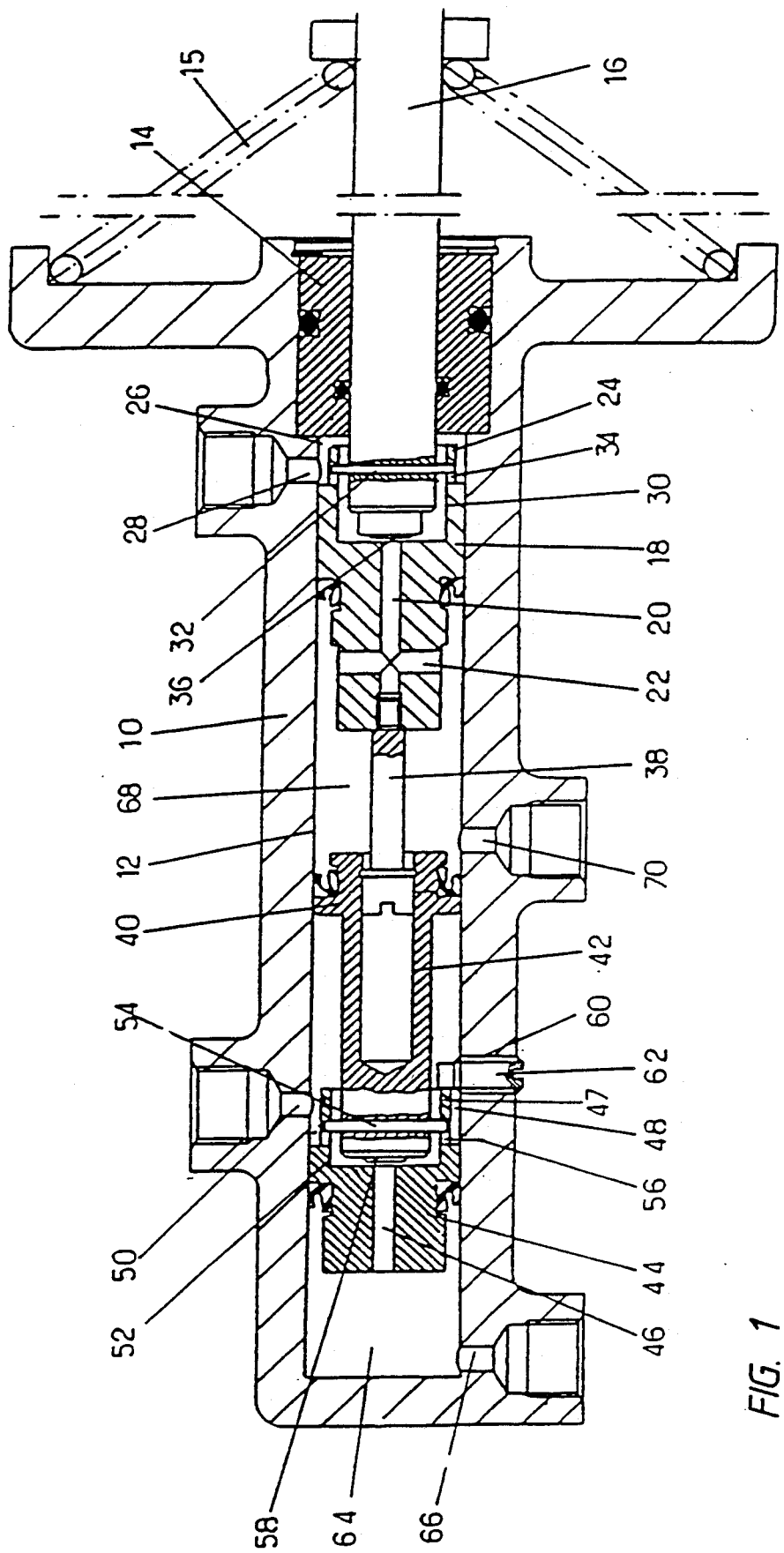
FIG. 1 is a longitudinal section of one embodiment of the invention.

In the description given below the word "rear" will by convention be used to describe the end towards which the movable parts are moved when these parts return to their position of rest, and the word "front" will be used to describe the end towards which the movable parts are moved when they are operated. The rear ends are directed towards the right in the drawings.

In FIG. 1 there is shown a tandem hydraulic pressure transmitter device according to a first embodiment of the invention, which consists of a body 10 of generally cylindrical shape, in which a blind bore 12 is formed. At its rear end this bore receives a sleeve 14 in which an operating rod 16 slides sealingly. This rod may in turn be operated directly by a brake pedal (not shown), by a thrust rod of a servo unit (not shown), or by any other means.

A stepped piston 18 slides sealingly in the bore 12, and is provided with an axial bore 20 and a diametral bore 22 in such a manner as to bring into communication the spaces situated in front of and behind said piston. At its rear end the piston 18 has a portion 24 whose diameter is smaller than that of the bore 12, thus defining an annular space 26 communicating via an aperture 28 formed in the body 10 with a source of liquid (not shown).

The piston 18 is provided at its rear with a blind bore 30 and cooperates with the rod 16 by means of a pin 32 rigidly fixed to the front portion of the latter which penetrates into the bore 30, said pin 32 extending radially out of the rod 16 into oblong apertures 34 in the piston 18, the length of said apertures being greater than the diameter of the pin so as to allow a certain dead travel when the rod 16 advances towards the piston 18. The rod 16 is in addition provided at its front end with a valve 36 adapted to open and close the axial bore 20 in the piston 18. At its front end the latter is fastened to a rod 38.

An intermediate stepped piston 40 likewise slides sealingly in the bore 12, its rear end being provided with a blind bore 42 in which the rod 38 carried by the piston 18 is slidable so as to make a connection between these two pistons with liquid damping.

A piston 44 likewise slides sealingly in the bore 12. This piston is also provided with an axial bore 46 bringing into communication the spaces situated in front of and behind said piston. At its rear end the piston 44 has a portion 47 whose diameter is smaller than that of the bore 12, thus defining an annular space 48 communicating via an aperture 50 formed in the body 10 with a source of liquid (not shown).

At its rear end the piston 44 is provided with a blind bore 52 and cooperates with the intermediate piston 40 by means of a pin 54 rigidly fixed to the front part of the latter which penetrates into the bore 52, the pin 54 extending radially out of the piston 40 into oblong apertures 56 in the piston 44, the length of said apertures being greater than the diameter of the pin so as to allow a certain dead travel when the piston 40 advances towards the piston 44. The intermediate piston 40 is in addition provided at its front end with a valve 58 adapted to open and close the axial bore 46 in the piston 44.

The body 10 is also provided with a tapped bore 60 receiving a screw 62 projecting into the interior of the bore 12 and serving as a rear stop to limit the return of the piston 44.

The primary working chamber formed by the space 68 between the piston 18 and the piston 40 communicates via the aperture 70 formed in the body 10 with hydraulic pressure receivers (not shown) by way of pipes (not shown). Similarly, the secondary working chamber consisting of the space 64 between the piston 44 and the bottom of the bore 12 communicates via the aperture 66 formed in the body 10 with other hydraulic pressure receivers (not shown) via pipes (not shown).

The operation of the tandem hydraulic pressure transmitter device just described is as follows. In its position of rest all the components occupy their rear positions, that is to say on the right in the drawings.

The primary circuit consists of the aperture 28, the annular space 26, the apertures 34, the space between the rod 16 and the piston 18, the axial bore 20, the diametral bore 22, the space 68 and the aperture 70.

The secondary circuit is composed of the aperture 50, the annular space 48, the apertures 56, the space between the piston 40 and the piston 44, the axial bore 46, the space 64, and the aperture 66.

In the position of rest the hydraulic pressure receivers (not shown) communicate via the primary and secondary circuits with a source of liquid and are at the same pressure as said source of liquid.

When the device is operated the rod 16 is pushed forwards (towards the left in FIG. 1) by a brake pedal, by the thrust rod of a servo unit, or by any other means. After a certain dead travel allowed by the clearance left between the pin 32 and the oblong apertures 34, the valve 36 closes the axial bore 20 of the piston 18, thus interrupting the primary circuit. The rod 16 then pushes the piston 18 and the rod 38 directly.

The rod 38 tends to penetrate into the rear bore 42 in the piston 40 but, because of the coupling with fluid damping between these two parts, it first communicates its movement to the intermediate piston 40. After a certain dead travel allowed by the clearance left between the pin 54 and the oblong apertures 56, the valve 58 closes the axial bore 46 in the piston 44, thus in turn interrupting the secondary circuit. The piston 40 then pushes the piston 44 directly. Through the combined action of the connection with fluid damping between the pistons 40 and 44, and of the slight length of the dead travels at the pins 32 and 54, the closing of the valves 36 and 58 is practically simultaneous. The spaces 68 and 64 are then both isolated from the sources of fluid and their volumes decrease, so that each of them gives rise to an increase of pressure which is transmitted to the hydraulic pressure receivers by way of the apertures 70 and 66.

As soon as the braking force ends, the rod 16 returns to the rear through the action of a return spring 15, carrying with it, by means of the pin 32, the piston 18 and the rod 38.

The coupling with fluid damping between the rod 38 and the piston 40 then drives the intermediate piston 40 by means of the rod 38, and finally the piston 40 carries with it the piston 44 through the action of the pin 54 until the latter comes to bear against the rear stop formed by the screw 62, while the rod 38 moves out of the bore 42 and enables the piston 18 to bear at the rear against the sleeve 14. The valves 36 and 58 then open, thus allowing the liquid to flow back from the hydraulic pressure receivers to the source of fluid by way of the primary and secondary circuits.

It can thus be seen that through the combined action of the coupling with fluid damping between the pistons 40 and 44 and the driving of the pistons 18 and 40 by the respective pins 32 and 54, the pistons 18 and 40 return to their positions of rest without it being necessary to use return springs, so that it is possible for the spaces 68 and 64 to be given small volumes, thus reducing both the length and the weight of the pressure transmitter device.

Furthermore, the operation of the device is ensured in the event of failure:

if the primary circuit is defective, that is to say if a leak prevents an increase of pressure in this circuit, the rod 16 pushes the piston 18, which comes to bear against the piston 40 which in turn pushes the piston 44, thus bringing about the increase in pressure in the secondary circuit;

if the secondary circuit is defective, the piston 44 comes to bear against the bottom of the bore 12, the piston 40 comes to bear against piston 44, and the increase in pressure can then be achieved in the primary circuit.

In the embodiment which has just been described, if the sources of fluid connected to the apertures 28 and 50 are not under pressure, equal pressures will be obtained at the outlet apertures 70 and 66 in direct dependence on the force F applied to the rod 16. At the commencement of the operation, after the valves 36 and 58 have been closed, the pressure P prevailing in the chamber 68 is in fact transmitted via the aperture 70 to a pressure receiver, but it is also applied to the rear section S of the piston 40, thus transmitting the force $F=P.S$ to the front section S of the piston 44 and thus producing in the chamber 64 the pressure $P=P.S/S=P$ transmitted via the aperture 66 to another pressure receiver.

Similarly, if the sources of fluid connected to the apertures 28 and 50 are subjected to the same pressure, the pressure transmitter device will transmit via the outlet apertures 70 and 66 this same pressure plus the pressure produced by the force received from the rod 16. Nevertheless, for reasons of safety it is then preferable to adopt the embodiment illustrated in FIG. 2.

Figure 2:
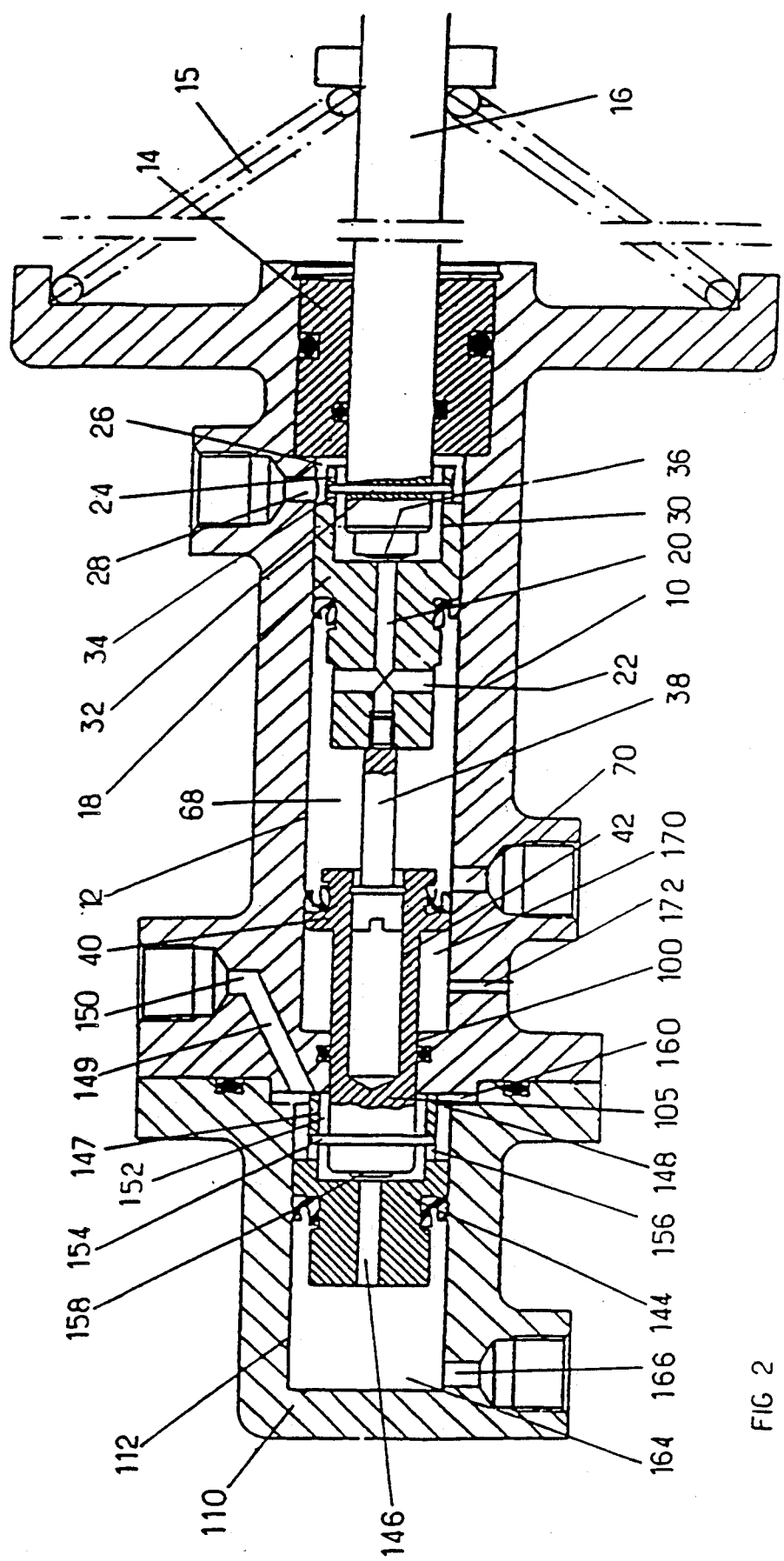
FIG. 2 shows a variant of the embodiment shown in FIG. 1.

In FIG. 2 components identical to those shown in FIG. 1 are given the same reference numerals.

In contrast to FIG. 1, the stepped bore 12 is here a through bore and has one additional stage, given the reference 100, in which the head 105 of the intermediate piston 40 slides sealingly, thus projecting from the body 10. On the body 10 is fixed a member 110 provided with a stepped blind bore 112 coaxial with the bore 12 and having a piston 144 sliding sealingly in it. This piston is likewise provided with an axial bore 146 bringing into communication the spaces situated in front and to the rear of said piston. The piston 144 is provided at its rear end with a portion 147 whose diameter is smaller than that of the bore 112, so that an annular space 148 is formed.

At its rear end the piston 144 is provided with a blind bore 152 and cooperates with the intermediate piston 40 by means of a pin 154 fixed rigidly to and extending radially out of the latter into oblong apertures 156 in the piston 144, the length of said apertures being greater than the diameter of the pin, so as to allow a certain dead travel when the piston 40 advances towards the piston 144. As previously, the intermediate piston 40 is provided at its front end with a valve 158 adapted to open and close the axial bore 146 in the piston 144.

The space 164 between the piston 144 and the bottom of the bore 112 communicates via the aperture 166 formed in the member 110 with pressure receivers (not shown) by way of pipes (not shown).

The rear part of the bore 112 has a larger diameter than the latter and defines an annular space 160 communicating with the annular space 148. The annular space 160 is in communication with an aperture 150, which is connected to a source of fluid, by way of a bore 149 formed in the body 10. In order to enable the piston 40 to slide, the annular space 170 between it and the bore 12 is in conventional manner subjected to a pressure slightly lower than atmospheric pressure, making use of a bore 172 formed in the body 10 and provided with a valve to prevent entry of water or corrosive vapors.

In the device shown in FIG. 2 the primary circuit is identical to that in FIG. 1, while the secondary circuit is here formed by the aperture 150, the bore 149, the annular space 160, the annular space 148, the apertures 156, the space between the piston 40 and the piston 144, the axial bore 146, the space 164, and the aperture 166.

If the sources of fluid connected to the apertures 28 and 150 are not under pressure and if the diameter of the bore 112 is equal to that of the bore 12, the operation of the device shown in FIG. 2 is identical to that of the device shown in FIG. 1. By giving the bore 112 a diameter different from that of the bore 12 it will be possible to obtain different pressures at the outlet apertures 70 and 166, depending on the difference in diameter of the bores 12 and 112.

A particularly interesting case of utilization of the device shown in FIG. 2 is that in which the sources of fluid connected to the apertures 28 and 150 are already under pressure. The tandem pressure transmitter device according to the invention then works as a pressure amplifier and supplies an equal pressure at the outlet apertures by correct choice of the sections of the bores 12 and 112.

More precisely, if $P_e$ designates the liquid pressure at the inlet of the primary and secondary circuits, $P_1$ and $P_2$ the pressures of the liquid at the outlets of the primary and secondary circuits respectively, $S_1$ and $S_2$ the sections of the bores 12 and 112 respectively, $S_3$ the section of the annular space formed between the piston 144 and the bore 112, $S_4$ the section of the annular space formed between the rod 16 and the bore 12, and F the force transmitted by the rod 16, it will be understood that the equilibrium of the system during operation is such that the primary piston 18 is subjected at the front to a force $P_1S_1$ and at the rear to a force $P_eS_4$ plus the force F, while the secondary piston 144 is subjected at the front to a force $P_2S_2$ and at the rear to a force $P_eS_3$ plus in turn the force $P_1S_1$.

The equilibrium of the system requires that for each piston there must be:

$$P_1S_1 = P_eS_4 + F$$

and $$P_2S_2 = P_eS_3 + P_1S_1.$$

If it is desired that the pressures $P_1$ and $P_2$ at the outlets of the primary and secondary circuits should be equal for any inlet pressure $P_e$, it is sufficient to have:

$$S_2 = S_1(1 + P_eS_3)$$

$$P_eS_4 + F$$

or, calling P the pressure common to the two outlets and R the ratio of the outlet pressure to the inlet pressure, $$R = \frac{P}{P_e}$$

that is $$S_2 = S_1 + \frac{S_3}{R}$$

that is to say that $S_2$ should be greater than $S_1$ in accordance with the above relationship. As previously, a different choice of $S_1$ and of $S_2$ will lead to different pressures $P_1$ and $P_2$ at the outlets of the primary and secondary circuits, in any desired proportion.

It is clearly understood that the invention is not restricted to the embodiments illustrated, but on the contrary may undergo numerous modifications within the scope of those skilled in the art. For example, the pressures of the sources of liquids at the input of the primary and secondary circuits may be different, and by selection of the sections $S_1$ and $S_2$ equal pressures will be obtained at the outlet of the device. It is in addition obvious that the invention can be applied to any type of tandem master cylinder, for example of the expanding hole type, the flap type, the rocking valve type, and so on. Similarly, in certain cases it will be possible to provide for the primary and/or secondary pistons to be fastened to their respective operating means, the operating rod serving as primary piston and/or the intermediate piston serving as secondary piston. Finally, when the device according to the invention is intended for a hydraulic braking circuit it may constitute the master cylinder operated by the brake pedal or by a servo unit, or the auxiliary master cylinder, or may be inserted in an anti-wheel-lock device.

We claim:

1. A tandem hydraulic pressure transmitter device, particularly for a hydraulic circuit in a motor vehicle, comprising a first piston sliding sealingly in a first bore, adapted to be operated by first operating means, and transmitting a first pressure to at least one pressure receiver, and a second piston sliding sealingly in a second bore, adapted to be operated by second operating means connected with the second piston, and transmitting a second pressure to at least one other pressure receiver, wherein said first and second pistons are returned to positions of rest by said first and second operating means, respectively, and the second operating means is connected to the first piston by fluid damping means.

2. The tandem hydraulic pressure transmitter device of claim 1, wherein the first piston is operated for return to the position of rest by the first operating means with the aid of a pin fixed rigidly to said first operating means and extending radially out of the first operating means into oblong apertures in the first piston.

3. The tandem hydraulic pressure transmitter device of claim 1, wherein said second piston is operated for return to the position of rest by the second operating means with the aid of a pin fixed rigidly to said second operating means and extending radially out of the latter into oblong apertures in the second piston.

4. The tandem hydraulic pressure transmitter device of claim 1, wherein the second operating means consists of an intermediate piston sliding sealingly in the first bore.

5. The tandem hydraulic pressure transmitter device of claim 1, wherein the first piston is fastened to the first operating means.

6. The tandem hydraulic pressure transmitter device of claim 1, wherein the first and second bores have identical diameters.

7. The tandem hydraulic pressure transmitter device of claim 1, wherein the first and second bores have different diameters.

8. The tandem hydraulic pressure transmitter device of claim 1, wherein the second bore has a diameter greater than a diameter of the first bore.

* * * * *